US012603244B2

(12) United States Patent
Morris et al.

(10) Patent No.: US 12,603,244 B2
(45) Date of Patent: Apr. 14, 2026

(54) ELECTRIC MOTOR FOR DUAL ENDED X-RAY TUBE

(71) Applicant: Varex Imaging Corporation, Salt Lake City, UT (US)

(72) Inventors: Thomas Anton Morris, Spanish Fork, UT (US); Shailesh Kapadia, Cincinnati, OH (US); Patrick Lewis, West Jordan, UT (US); Spencer Shore, Sandy, UT (US); Karma Sok-choekore, West Jordan, UT (US)

(73) Assignee: Varex Imaging Corporation, Salt Lake City, UT (US)

( * ) Notice: Subject to any disclaimer, the term of this patent is extended or adjusted under 35 U.S.C. 154(b) by 418 days.

(21) Appl. No.: 18/360,469

(22) Filed: Jul. 27, 2023

(65) Prior Publication Data

US 2024/0038479 A1     Feb. 1, 2024

Related U.S. Application Data

(60) Provisional application No. 63/392,782, filed on Jul. 27, 2022.

(51) Int. Cl.
| | |
|---|---|
| *H01J 35/10* | (2006.01) |
| *H02K 1/14* | (2006.01) |
| | (Continued) |

(52) U.S. Cl.
CPC ....... *H01J 35/101* (2013.01); *H01J 2235/104* (2013.01); *H01J 2235/1262* (2013.01);
(Continued)

(58) Field of Classification Search
CPC .............. H01J 35/101; H01J 2235/104; H01J 2235/1262; H02K 1/146; H02K 1/165; H02K 1/20; H05G 1/04
See application file for complete search history.

(56) References Cited

U.S. PATENT DOCUMENTS

| | | | |
|---|---|---|---|
| 4,225,787 A | 9/1980 | Shapiro et al. | |
| 5,781,609 A | 7/1998 | Gerling | |
| | (Continued) | | |

FOREIGN PATENT DOCUMENTS

| | | |
|---|---|---|
| EP | 2568576 A2 | 3/2013 |
| KR | 101512620 B1 | 4/2015 |

OTHER PUBLICATIONS

PCT/2023/071121 International Search Report and Written Opinion mailed Dec. 21, 2023 (12 pages).

*Primary Examiner* — Chih-Cheng Kao
(74) *Attorney, Agent, or Firm* — Dorsey & Whitney LLP

(57) ABSTRACT

An x-ray tube includes a housing containing cooling oil and a vacuum envelope disposed within the housing and including a solid envelope wall. The oil is disposed between the housing and wall. An anode and cathode are arranged in a vacuum environment and surrounded by the wall. A rotor connected to the anode is arranged on bearings within the vacuum environment. Additionally, a stator assembly positioned within the oil surrounds the rotor to define an oil-filled annular gap. The stator assembly includes a stator core, stator teeth spaced apart by intervening stator slots, and stator windings disposed within the stator slots. Each stator tooth includes a tooth tip positioned adjacent to the boundary wall and set a distance apart from the stator windings to form an intra-slot cooling channel in fluid communication with the oil-filled annular gap such that the stator teeth inclusive of its tooth tips are immersed in oil.

20 Claims, 9 Drawing Sheets

(51) Int. Cl.
    *H02K 1/16*          (2006.01)
    *H02K 1/20*          (2006.01)
    *H05G 1/04*          (2006.01)

(52) U.S. Cl.
    CPC ............. *H02K 1/146* (2013.01); *H02K 1/165*
        (2013.01); *H02K 1/20* (2013.01); *H05G 1/04*
                         (2013.01)

(56) References Cited

U.S. PATENT DOCUMENTS

| | | | |
|---|---|---|---|
| 2005/0057106 A1* | 3/2005 | Allen ...................... | H02K 9/227 |
| | | | 310/214 |
| 2007/0200441 A1 | 8/2007 | El-Antably et al. | |
| 2013/0077757 A1* | 3/2013 | Deuringer ............. | H01J 35/101 |
| | | | 378/131 |
| 2023/0155430 A1* | 5/2023 | Beyerl ................... | H02K 3/345 |
| | | | 310/254.1 |

\* cited by examiner

ELECTRIC MOTOR FOR DUAL ENDED X-RAY TUBE

BACKGROUND

Vacuum tubes are used in a wide range of applications to control the flow of an electric current between separated electrodes within a sealed vacuum chamber. An x-ray tube in particular is a specialized type of vacuum tube commonly used to generate and direct x-ray radiation for various beneficial purposes, such as medical imaging, radiology, diagnostics, radiography, tomography, non-destructive testing, materials analysis, security applications, and inspection. Conventional x-ray tubes operate by emitting a concentrated electron beam via an energized cathode. The emitted electron beam is then directed toward an anode-mounted target. The anode rotates via operation of an electric motor in certain configurations, such as the high-energy dual-ended x-ray tubes contemplated herein.

The emitted electrons gain energy and accelerate based on the large potential difference across the intervening space between the rotating anode and the stationary cathode. Some of the accelerated electrons collide with the target surface on the rotating anode, with a relatively small portion of the incident electron beam energy being converted into useful x-ray radiation. The bulk of the remaining energy forms waste heat to be dissipated from the x-ray tube via cooling oil or another suitable cooling system. As a result, thermal properties of the x-ray tube must be carefully regulated to protect the electric motor and other heat-sensitive components of the x-ray tube.

Rotational forces acting on the target anode disk in a high-energy dual-ended x-ray tube construction are imparted by the above-noted electric motor. In a typical configuration, the anode is powered by a small induction motor having a concentrically positioned rotor and stator. The rotor, which is positioned within a vacuum envelope, revolves on a bearings, with liquid metal bearings (LMBs) being an emerging technology providing a myriad of performance advantages relative to traditional metal bearings. The stator for its part is immersed in or surrounded by cooling oil outside of the vacuum envelope, such that the rotor and stator are positioned on opposite sides of a solid envelope wall. However, LMB-equipped tubes require higher levels of torque suitable for creating sufficient initial hydrodynamic lift while overcoming fluidic friction at low speeds. Drag increases with the rotary speed of the rotor. As a result of this relationship, operation of LMB-equipped tubes at high rates of speed requires high levels of torque and good high-speed efficiency, both of which present significant additional thermal management problems.

SUMMARY

The present disclosure pertains to high-energy dual-ended x-ray tubes in which a stator is immersed in cooling oil while an opposing rotor is positioned within a vacuum, which in turn is an insulator posing significant cooling challenges. In such an x-ray tube, the high electric potential of the anode requires a relatively large radial standoff distance between the rotor and the surrounding stator. For instance, an exemplary radial gap of about 0.2 inches to about 0.6 inches could be used for the x-ray tubes described herein, with such a range an order of magnitude larger than typical radial gap sizes. Liquid metal bearing (LMB)-equipped dual-ended x-ray tubes as summarized above would benefit from the integration of electric motors having increased efficiency.

One way to increase this efficiency is to reduce the large radial standoff distance. However, any stator-rotor gap reduction may promote overheating. As a result, high-energy dual-ended X-ray tubes tend to be suboptimal in terms of their overall size and operating efficiency. The various structural solutions presented herein therefore seek to reduce the standoff distance without adversely impacting operating efficiency. Such benefits are provided largely through modifications to the stator as set forth in detail hereinbelow.

The term "standoff distance" as used herein and in the general art includes (i) the thickness of the envelope wall, (ii) a vacuum gap extending between the rotor and an inner side of the envelope wall of the above-noted vacuum envelope, and (iii) an oil-filled gap extending between an outer side of the envelope wall of the vacuum envelope and the surrounding stator. Cooling oil is circulated through the oil-filled gap along an inner diameter (ID) of the stator assembly to prevent overheating of the stator and surrounding components of the x-ray tube. Decreasing the standoff distance, without doing more, could result in overheating of the x-ray tube, thus introducing thermal management concerns due to the need to extract excess heat from the cooling oil. The following solutions therefore also seek to reduce the standoff distance without restricting the flow of cooling oil.

In particular, the solutions set forth below deviate from a standard stator winding configuration by changing the spatial relationship between the stator slot and the windings disposed therein, along with modifying a flow path for the circulating cooling oil. As appreciated in the art, a standard induction motor fills the individual stator slots with conductive windings and provides a relatively large standoff distance. The changes described herein result in similar net cooling flow with a decreased standoff distance, thereby enabling increased output torque from the motor, improved overall performance, and higher operating efficiency.

BRIEF DESCRIPTION OF THE DRAWINGS

The drawings described herein are for illustrative purposes only, are schematic in nature, and are intended to be exemplary rather than to limit the scope of the disclosure.

Figure 1:
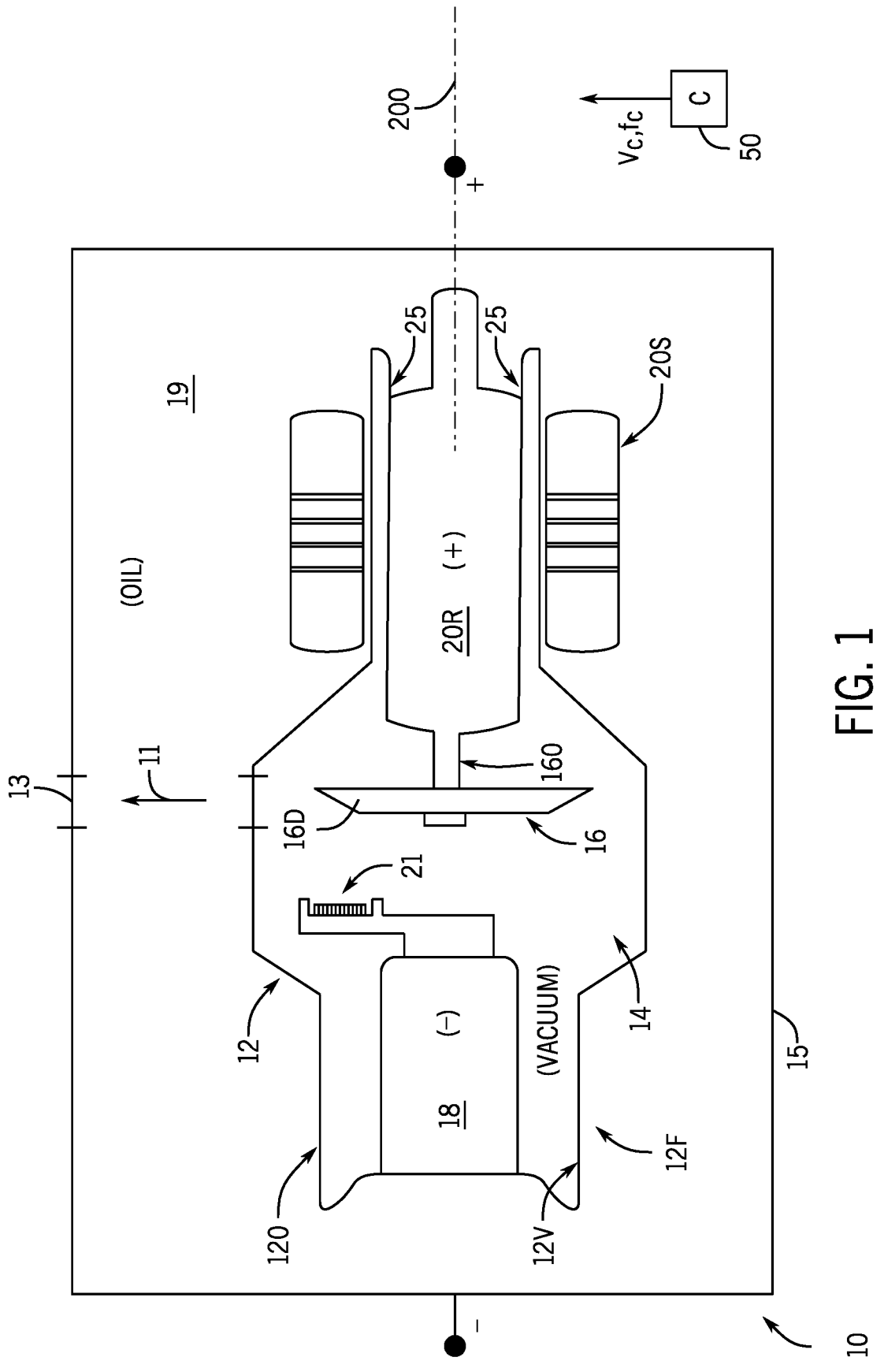
FIG. 1 is an illustration of an exemplary high-energy dual-ended x-ray tube constructed in accordance with the present disclosure.

The present disclosure is susceptible to modifications and alternative forms, with representative embodiments shown by way of example in the drawings and described in detail below. Inventive aspects of this disclosure are not limited to the disclosed embodiments. Rather, the present disclosure is intended to cover alternatives falling within the scope of the disclosure as defined by the appended claims.

DETAILED DESCRIPTION

Embodiments of the present disclosure are described herein. The disclosed embodiments are provided as examples and illustration of the various solutions. The drawings are not necessarily to scale, with some features possibly exaggerated or minimized to show particular details of interest. Therefore, specific structural and functional details disclosed herein are not to be interpreted as limiting, but merely as a representative basis for teaching one skilled in the art to variously employ disclosed structure and methodologies.

Numbers provided in flow charts and process descriptions are intended to improve clarity, and do not necessarily indicate a particular order or sequence. For purposes of the present detailed description, words of approximation, such as "about," "substantially," "generally," "approximately," and the like, may each be used herein in the sense of "at, near, or nearly at," or "within 0-5% of," or "within acceptable manufacturing tolerances," or any logical combination thereof.

Referring now to the drawings, wherein like reference numbers refer to like components, an exemplary high-energy dual-ended x-ray tube 10, hereinafter referred to as the x-ray tube 10 for simplicity, is depicted in FIG. 1. The x-ray tube 10 as contemplated herein is operable for generating and emitting x-ray radiation 11 through a port 13 toward an object to be imaged, e.g., a patient's chest or appendage (not shown). Such components include a solid envelope wall 12 forming a vacuum envelope, and thus defining a vacuum chamber 14 ("VACUUM") as a void volume within which is situated a positively-charged anode assembly 16 and a negatively-charged cathode assembly 18. The solid envelope wall 12, which may be constructed of metal, ceramic, or glass in possible embodiments, is enclosed within a housing 15 filled with cooling oil 19 ("OIL"). In a typical application, the cooling oil 19 may be constructed of a suitable transformer oil, i.e., a dielectric oil or another suitable dielectric liquid coolant. Thus, the solid envelope wall 12 forms separate isolated vacuum and fluid-filled volumes, with the solid envelope wall 12 likewise having a fluid side 12F and a vacuum side 12V.

Within the two disparate operating environments of the x-ray tube 10 shown in FIG. 1, the anode 16 and cathode 18 are disposed within the vacuum environment of the vacuum chamber 14. The anode 16, which is rotatable in the various embodiments envisioned herein, is connected to an anode stem 160, with the anode stem 160 in turn being coupled to a rotor 20R of an electric motor 20 (comprising rotor 20R and stator 20S), e.g., an induction-type polyphase/4-pole squirrel cage rotor, hereinafter the electric motor for simplicity and brevity. Such an electric motor 20 can be controlled using speed control using variable frequency drive (VFD) from a motor controller 50 in some implementations, such that the motor controller 50 drives the electric motor 20 by varying the frequency ($f_C$) and voltage ($V_C$) supplied to the electric motor 20. The rotor 20R, like the aforementioned anode 16 and cathode 18, resides within the vacuum chamber 14, specifically within an axial neck 120 of the solid envelope wall 12, and is disposed on bearings 25, e.g., mechanical roller bearings or liquid metal bearings (LMB) in different implementations.

Figure 1A:
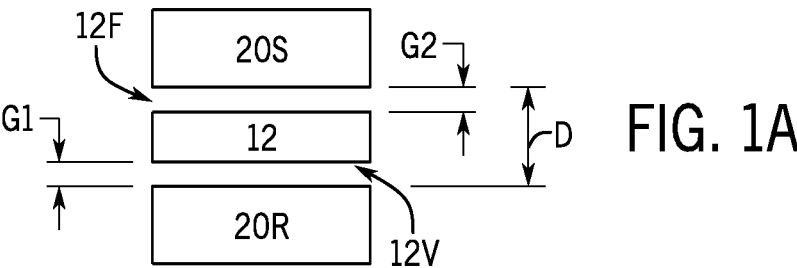
FIG. 1A is a partial cross-sectional view illustration of a stator assembly and rotor of the x-ray tube shown in FIG. 1 describing a radial stator-rotor gap.

The rotor 20R and the neck 120 shown in FIG. 1 are circumferentially surrounded by a stator assembly 20S of the electric motor 20, with the stator assembly 20S in turn being immersed in the cooling oil 19. The rotor 20R is thus mechanically and thermally isolated from the stator assembly 20S. Accordingly, the rotor 20R operating in a vacuum environment of the vacuum chamber 14 is extremely well insulated such that heat loss occurring in the rotor 20R has to be dissipated via conduction to the bearings 25 or via radiation to the solid envelope wall 12, or more precisely the neck 120 thereof. A standoff distance (D) is therefore defined between the stator assembly 20S and the rotor and is inclusive of: (i) a vacuum gap (G1) extending between the rotor 20R and the vacuum side 12V of the solid envelope wall 12, and (ii) an oil-filled gap (G2) extending between the fluid side 12F of the solid envelope wall 12 and the surrounding stator assembly 20S, as shown in FIG. 1A.

The x-ray tube 10 is exemplary of dual-ended x-ray tubes having a high potential applied to the anode 16. This high potential typically requires a large standoff distance (D), as appreciated in the art, which in turn tends to be much larger than is typical for electric motors. The large standoff distance (D) hinders performance and efficiency. However, the structural modifications made herein and described below with reference to FIGS. 2-12 allow the standoff distance (D) to be reduced, thereby providing notable performance improvements relative to the current state of the art.

Still referring to FIG. 1, when the stator assembly 20S is energized by a voltage signal ($V_C$) from the motor controller 50, or via a corresponding current signal, alternating forces of electromagnetic attraction and repulsion cause the rotor 20R to rotate about its longitudinal center axis 200. This in turn causes rotation of the anode 16, specifically a target disk 16D constructed, e.g., of tungsten. The target disk 16D provides a physical target for interaction with electrons emitted by the cathode 18, with x-rays ultimately generated from such interaction. In a typical construction, an electric current flowing through and heating the filament(s) 21 of the cathode 18 results in emission of electrons via the process of thermionic emission, as will be appreciated by those of ordinary skill in the art.

Figure 2:
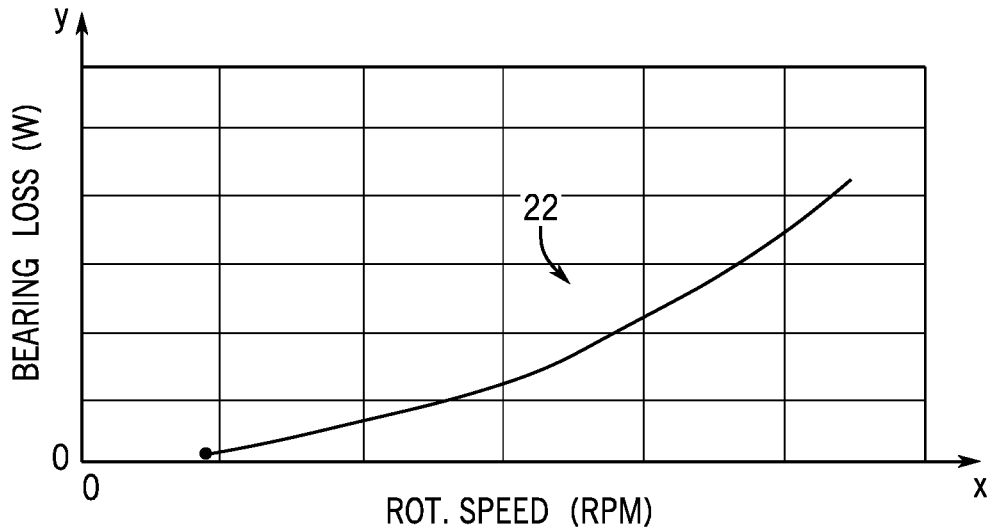
FIG. 2 is a representative performance curve describing a representative speed-vs.-loss relationship of the x-ray tube depicted in FIG. 1.

Referring to FIG. 2, a representative curve 22 shows a performance relationship between a rotary speed of the rotor 20R of FIG. 1, stated in revolutions per minute (RPM) arranged on the x-axis, and bearing losses stated in watts (W) arranged on the y-axis. FIG. 2 illustrates a particular challenge with operation of the x-ray tube 10 of FIG. 1 and similarly constructed high-energy/double-ended vacuum tubes. The rotor 20R ultimately rotates at very high rates of speed, e.g., 5000 RPM to 10000 RPM or more. As the rotary speed increases, however, so too does the bearing losses.

In a possible implementation of the present teachings, LMB technology can be retrofitted to an existing x-ray tube 10. However, the torque required from the electric motor 20 of FIG. 1 is higher with an LMB construction than with a traditional ball bearing-based tube, so as to create the initial hydrodynamic lift and overcome fluidic friction as previously noted hereinabove. The curve 22 of FIG. 2 represents the significant increase in drag and resultant loses that occurs with increasing run speeds. Thus, while the present teachings are not limited to LMB tubes, such tubes would benefit from an alternative construction of the electric motor 20 of FIG. 1, specifically one having increased efficiency from reductions in the standoff distance (D) and better overall cooling performance.

Figure 3:
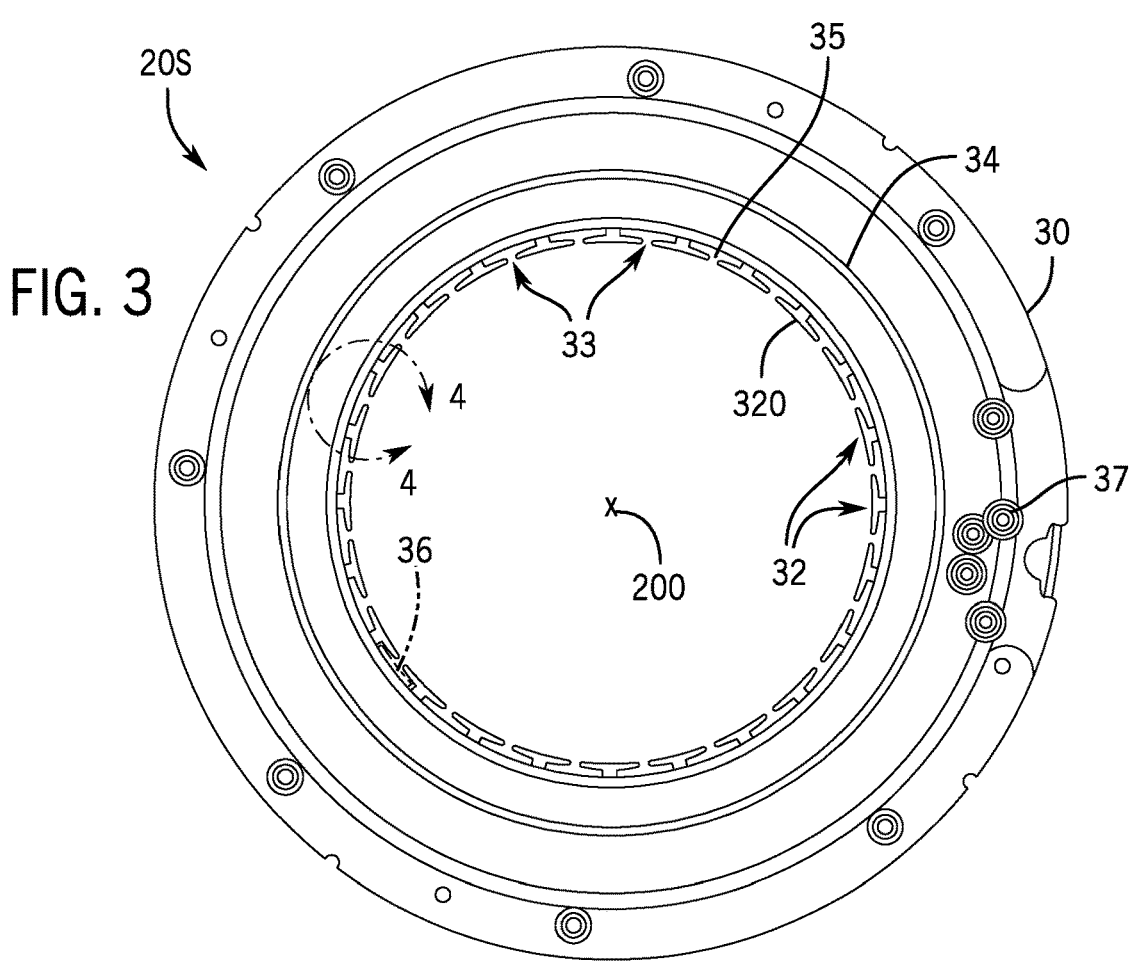
FIG. 3 is a plan view illustration of a stator assembly usable as part of the x-ray tube shown in FIG. 1.

Referring now to FIG. 3, the stator assembly 20S is shown in plan view, i.e., as viewed along the center axis 200. An outer ring 30, which may alternatively be referred to as a stator core, of the stator assembly 20S forms core supporting construction with the stator assembly 20S itself being assembled from a stack of thin steel laminations as appreciated in the art. When constructed in this manner, the stator assembly 20S has a cylindrical form with a plurality of radially-extending stator teeth 32. Each of the stator teeth 32 has a corresponding tooth tip 320 of a slightly arcuate shape, such that the stator teeth 32 are arranged end-to-end and spaced a short distance apart from one another by a tooth gap (e.g., 33). Such a tooth gap 33 can be between about 0.5% and 3.75% of the ID of the stator core, or between about 1.5% to about 2% in another embodiment. The stator assembly 20S also includes conductive stator windings 34 and phase leads 37 which are shown protruding from the ring 30. The stator windings 34, e.g., copper wires or cables, in turn are wound around the stator teeth 32 to substantially fill the stator slots 35. However, unlike typical winding constructions, a cooling region 36 is left open proximate the stator teeth 32.

That is, the present approach brings the stator teeth 32 of the stator assembly closer to the rotor 20R of FIG. 1, and thus into a path previously needed for oil flow. The stator windings 34 in turn are positioned farther back in the stator slots 35 so that the tooth tips 320 are open and surrounded by the cooling oil of FIG. 1. With flow directed into the stator slots 35 through the tooth gaps 33 disposed at the radially inwardmost surface of the stator teeth 32, sufficient flow/equivalent head loss is provided with a decrease in the standoff distance (D) of FIG. 1A.

A ratio of copper of the stator windings in the stator slots 35 to the total slot area is about 5% to 75% in a possible range, or about 30% to 35% in another implementation. In a possible embodiment, the radial gap between the rotor 20R and the stator assembly 20S can be about 1.8% to about 30% of the ID of the stator assembly 20S, or about 10% to about 12% in another construction, which in turn is about ID=11 inches (about 279 mm) or less in such a construction. The radial gap could be between about 1.4% and 20% of the outer diameter (OD) of the stator assembly 20S (e.g., the diameter of the ring 30/stator core in FIG. 3), or the stator core thereof, or about 5% to about 7% in another construction, with the OD being about 14 inches (about 356 mm) or less in this example.

In the contemplated embodiments described below with reference to FIGS. 4-12, a substantial portion of the oil flow still passes between the inner diameter of the stator assembly 20S (e.g., the diameter extending between opposite tooth tips 320 in FIG. 3) and the solid envelope wall 12 of FIG. 1. However, the remaining oil flow passes through the cooling regions 36, i.e., the unfilled portions of the stator slots 35 located near the tooth tips 320. Doing this increases the surface area in contact with the cooling oil, thereby increasing cooling of the stator assembly 20S. That is, the high magnetic fields at the tooth tips 320, absent the disclosed improvements, would ordinarily leave wasted heat and energy at this location. The introduction of cooling oil around the stator teeth 32 through the cooling regions 36 at this same location, including the tooth tips 320, thus increases cooling efficiency. Immersion of the tooth tips 320 in the cooling oil 19 thus enables the tooth tips 320 to act as cooling fins, thereby promoting the cooling and efficiency benefits contemplated herein.

In the applications contemplated herein, the rotor 20R is in an insulated environment of the vacuum chamber 14, i.e., the rotor 20R resides in a vacuum environment. Accordingly, the rotor 20R cannot be effectively cooled by circulation of the cooling oil 19 of FIG. 1. The x-ray tube 10, which already generates substantial heat during its operation, is therefore required to manage the additional heat from the rotor 20R. The cooling inefficiency of the rotor 20R manifests itself in the injection of additional heat, thereby decreasing the thermal overhead available for x-ray generation and increasing the time between exposures without the x-ray tube 10 or its bearings overheating. With LMB technology in particular, the bearings 25 of FIG. 1 are susceptible to seizing due to heat. This and other potential problems are mitigated via the cooling regions (e.g., 36 indicated in FIG. 3).

In terms of flow, at least 90% of the cooling oil 19 for cooling the stator assembly should travel along the ID of the stator core and around the tooth tips of the stator teeth 32. Essentially none of the cooling oil 19 thus travels across the OD of the stator core, or in this instance less than 10%. The stator assembly is thus cooled by direct contact with the cooling oil 19 using a flow rate of about 0.5 gallons per minute (gpm) to 10 gpm, with the relevant geometry defined such that the flow remains laminar at such example flow rates.

Figure 4:
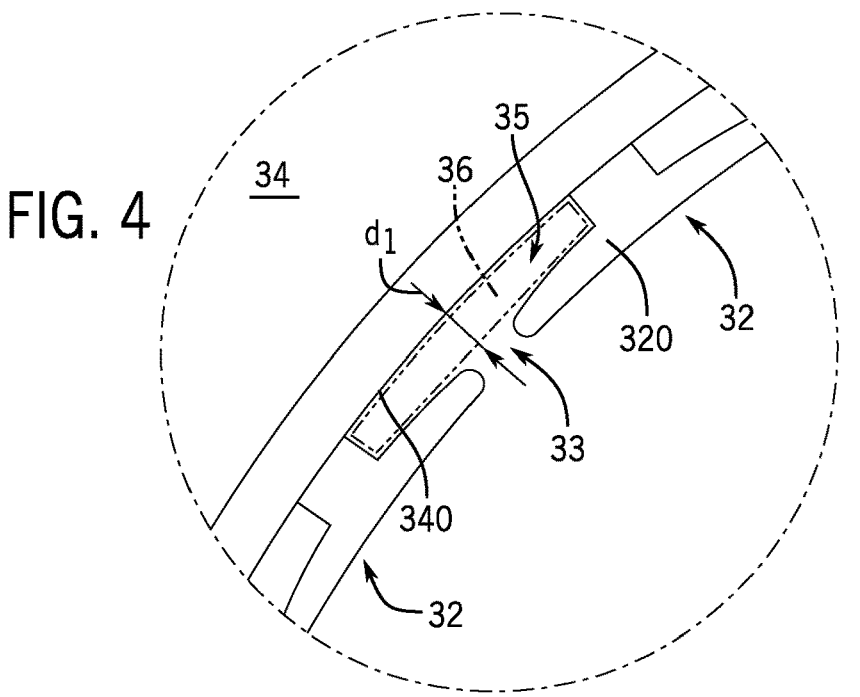
FIG. 4 is an illustration of a portion of the stator assembly shown in FIG. 3.

Referring now to FIG. 4, an adjacent pair of the stator teeth 32 of FIG. 3 is shown to further describe the cooling regions 36. As noted above, the stator teeth 32 extend radially toward the solid envelope wall 12, with the tooth tips 320 forming a generally T-shaped perimeter in the axial view of FIG. 4. The cooling regions 36 as envisioned herein extend from a radially inwardmost surface 340 of the stator windings 34 to the solid envelope wall 12. Thus, the stator teeth 32 and their tooth tips 320 are fully immersed in the cooling oil 19. In a possible exemplary construction, the tooth tips 320 are spaced apart from surface 340 by a distance ($d_1$) of at least about 0.08 inches.

Figure 5:
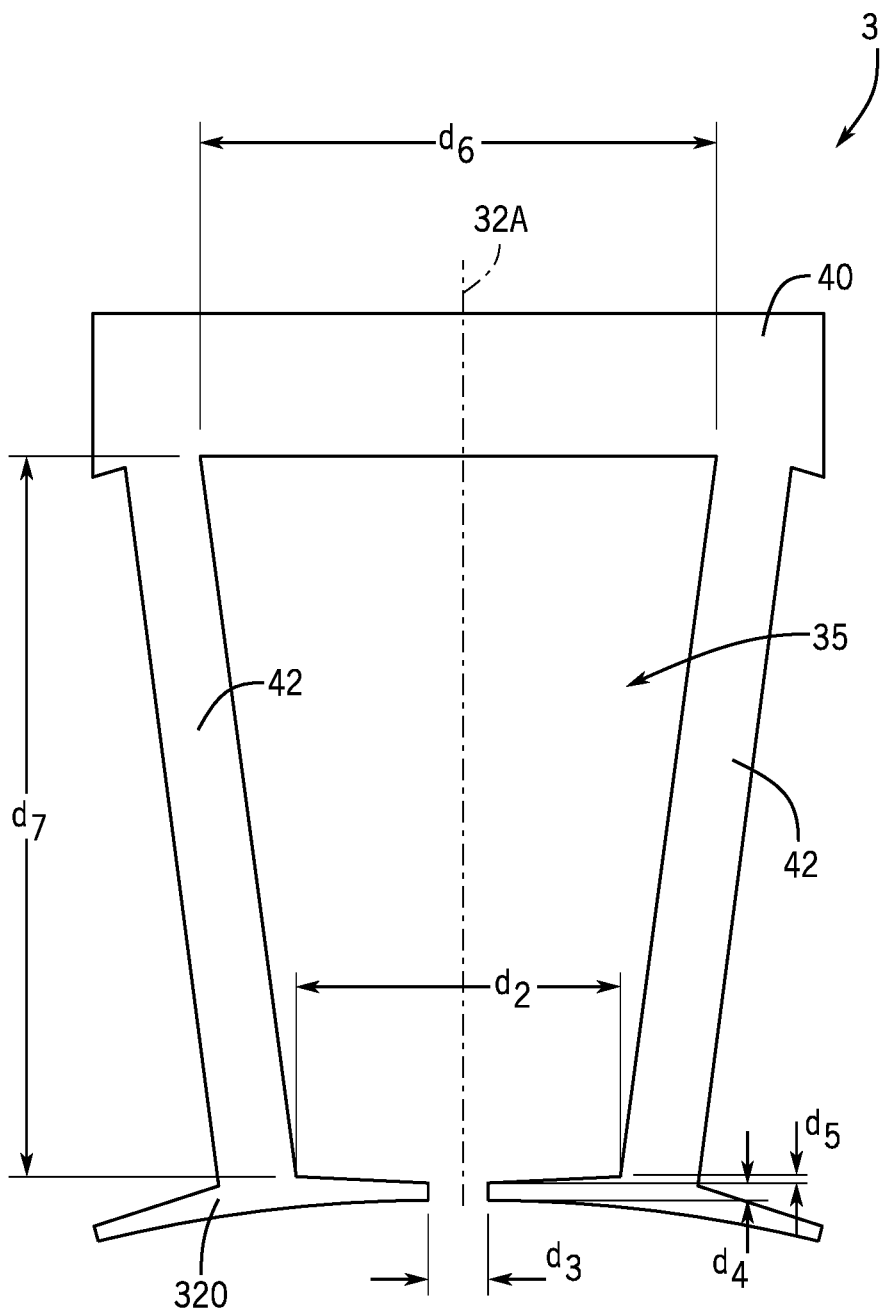
FIG. 5 is a plan view illustration of a representative stator tooth and slot arrangement in accordance with an aspect of the present disclosure.

A representative embodiment of the stator tooth 32 is shown in greater detail in FIG. 5. The stator tooth 32, which is symmetrical about a centerline 32A, includes an arcuate end 40 (alternatively referred to as a tooth root) and radial walls 42, such that the stator slot 35 is defined as the space between the arcuate end 40 and radial walls 42. The tooth gap 33 separates the tooth tips 320. Dimensions $d_2$, $d_3$, $d_4$, $d_5$, $d_6$, and $d_7$ collectively represent the construction of the stator tooth 32. In a non-limiting exemplary set of such dimensions, $[d_2, d_3, d_4, d_5, d_6, d_7]$=[0.431, 0.078, 0.020, 0.010, 0.685, and 0.970] inches. Other embodiments may be envisioned, of similar or different proportions, and therefore the illustrated dimensions are intended to be representative of just one possible construction for use with the x-ray tube 10 of FIG. 1. In a possible construction, the gap (G2) between the solid envelope wall 12 and the inner diameter (ID) of the stator core can be between about 0.3% and 3% of the ID dimension of the stator core, or about 1% to 1.5% in another embodiment. Similarly, the radial gap (G1) between the outer diameter (OD) of the rotor core (e.g., the outer diameter of cores 133, 135 or the teeth extending from those cores 133, 135 in FIGS. 7-8) and the solid envelope wall 12 can be between about 1.5% and 50% of the outer diameter dimension of the rotor core, with a range of about 10% to 11% being possible in another embodiment.

In terms of the stator assembly 20S itself, representative embodiments within the scope of the disclosure include those having an inner diameter of about 2 inches to 11 inches (50.8 mm to 279.4 mm). The stator assembly 20S can have a stator core length dimension (e.g., extending parallel to axis 200 between the left and right ends of the stator assembly 20S in FIG. 1) of between 0.70 inches and 2.5 inches (17.8 mm to 63.5 mm), or about 1.25 inches and 1.50 inches (31.75 mm and 38.1 mm) in another embodiment. In another aspect of the disclosure, the electric motor 20 of FIG. 1 can have a stator core length dimension of between 13% and 76% of the inner diameter of the stator core, or about 35% to 40% in a possible implementation. With respect to the rotor 20R, the rotor length dimension (e.g., extending parallel to axis 200 between left and right ends of the rotor 20R in FIG. 1) is about 0.90 inches to 3 inches (22.9 mm to 76.2 mm) in possible constructions, with rotor lengths of about 1.5 inches to 2 inches (38.1 mm to 50.8 mm) being used in other embodiments. Relative to the above-noted inner diameter of the stator core, the rotor length may be about 14.7% and 82.0% of the stator core inner diameter, or about 35% to 45% in another implementation. The tooth tips (e.g., 320) may extend beyond the stator windings (e.g., along dimension $d_1$) by more than 7% relative to a depth (e.g., d 7) of the stator slot 35, e.g., by 7% to 9%.

In still other embodiments, the stator core has an inner diameter of about 2 inches to 11 inches (50.8 mm to 279.4 mm) and a length dimension of about 0.70 inches and 2.5 inches (17.8 mm to 63.5 mm). Here, for stator inner diameters of less than 11 inches (63.5 mm), the radial gap (e.g., D in FIG. 1A) between the outmost surface of the rotor 20R and the innermost surface of the stator 20S can be between about 0.20 inches and 0.60 inches (5.1 mm to 15.2 mm). The radial gap may be between 1.8% and 30.0% of the inner diameter dimension of the stator core, with a gap relationship of about 10% to 12% being beneficial in certain constructions.

Figure 6A:
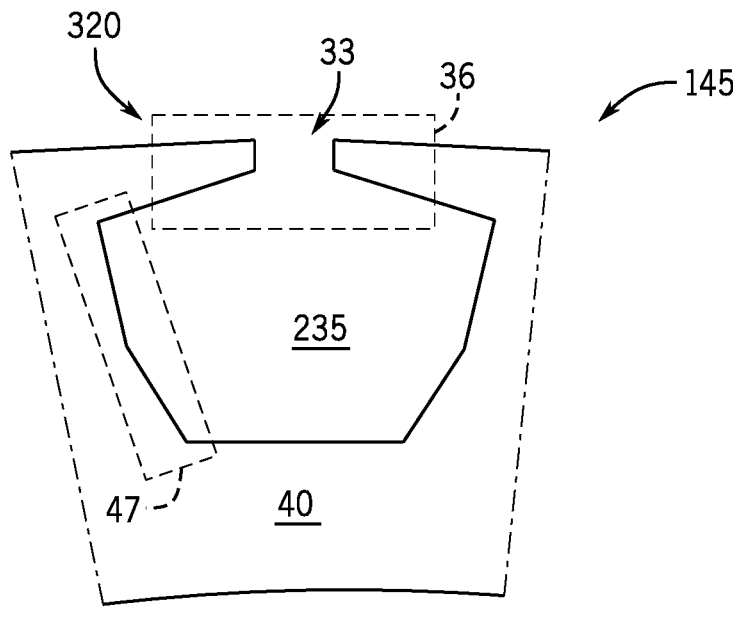
FIGS. 6A and 6B are schematic illustrations of possible alternative slot shapes for constructing the stator assembly of FIGS. 3 and 4.
Figure 6B:
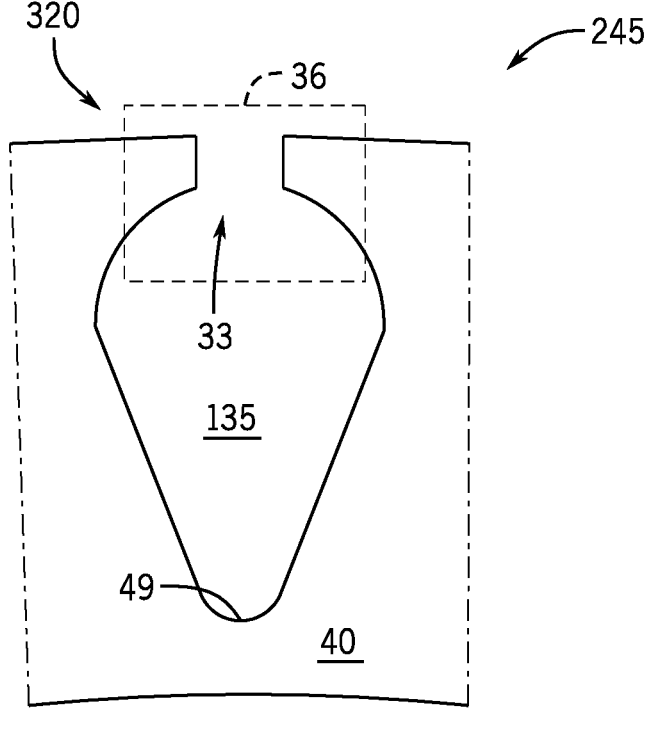

Referring briefly to FIGS. 6A and 6B, the above-described geometry and dimensions of the stator tooth 32 may vary within the scope of the disclosure to provide different levels of performance. For example, an alternative profile 145 as shown in FIG. 6A can include a multi-angled wall 47 rather than the straight/single walled approach of FIG. 5. Such an arrangement could be used to create a stator slot 135 having a generally hexagonal geometry. Likewise, an alternative profile 245 of FIG. 6B includes curvilinear surfaces 49 defining a stator slot 235 having a generally wedge-shaped or geometry, with the elimination of corners in contrast with FIGS. 5 and 6A providing possible advantages in terms of shaping desired flux concentrations and resulting heating. Thus, the construction of the stator tooth 32 described above can vary within the scope of the disclosure, without affecting the presence and benefits of the cooling region 36 enclosing the tooth tips 320.

Figure 7:
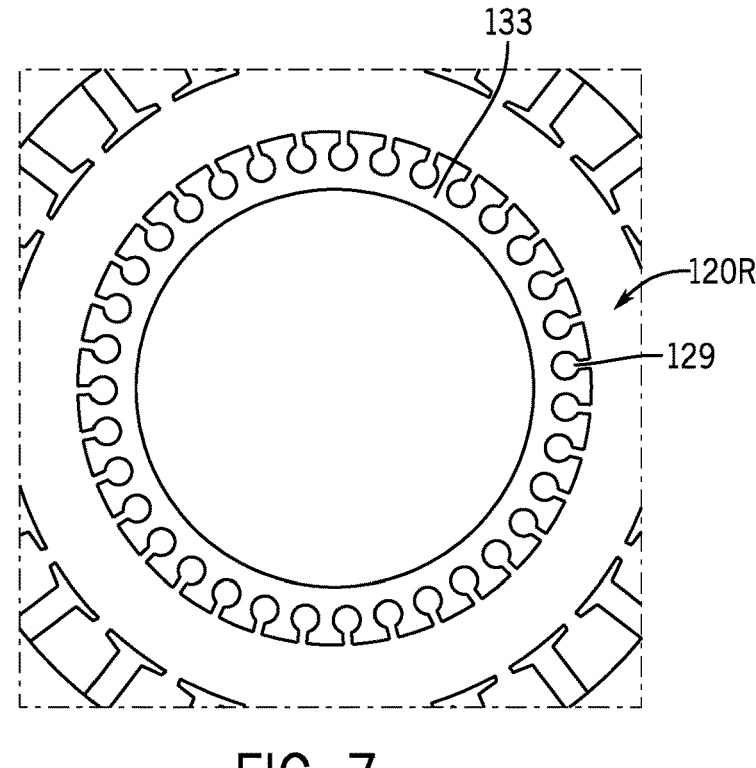
FIGS. 7 and 8 are plan view illustrations of different embodiments of a rotor assembly usable with the x-ray tube shown in FIG. 1.
Figure 8:
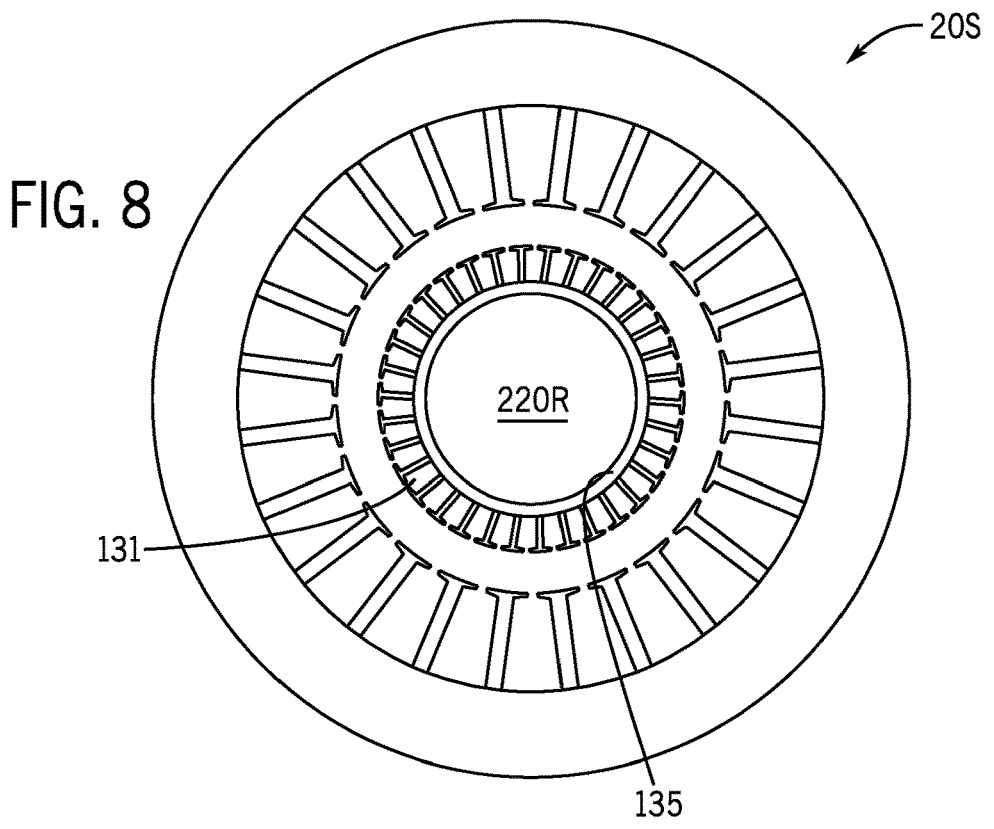

Referring now to FIGS. 7 and 8, the rotor 20R of FIG. 1 may likewise vary in its construction within the scope of the disclosure. FIG. 7, for instance, envisions a rotor 120R having a plurality of generally circular rotor slots 129, while FIG. 8 depicts an alternative rotor 220R having rectangular rotor slots 131. Such configurations may be configured for use with a 3-phase/4-pole embodiment of the electric motor 20 of FIG. 1. The slots 29 and 129 in a completed construction would be filled with ferromagnetic rotor bars (e.g., 55, discussed in connection with FIG. 9) of a corresponding cross-sectional shape, as appreciated in the art. Relative performance can vary as between the embodiments of FIGS. 7 and 8, or other possible embodiments. Higher speed performance of the LMB-based configurations of the x-ray tube 10 contemplated herein, however, would benefit from the design of FIG. 8, particularly in terms of increased torque performance and efficiency at higher rotational speeds.

Figure 9:
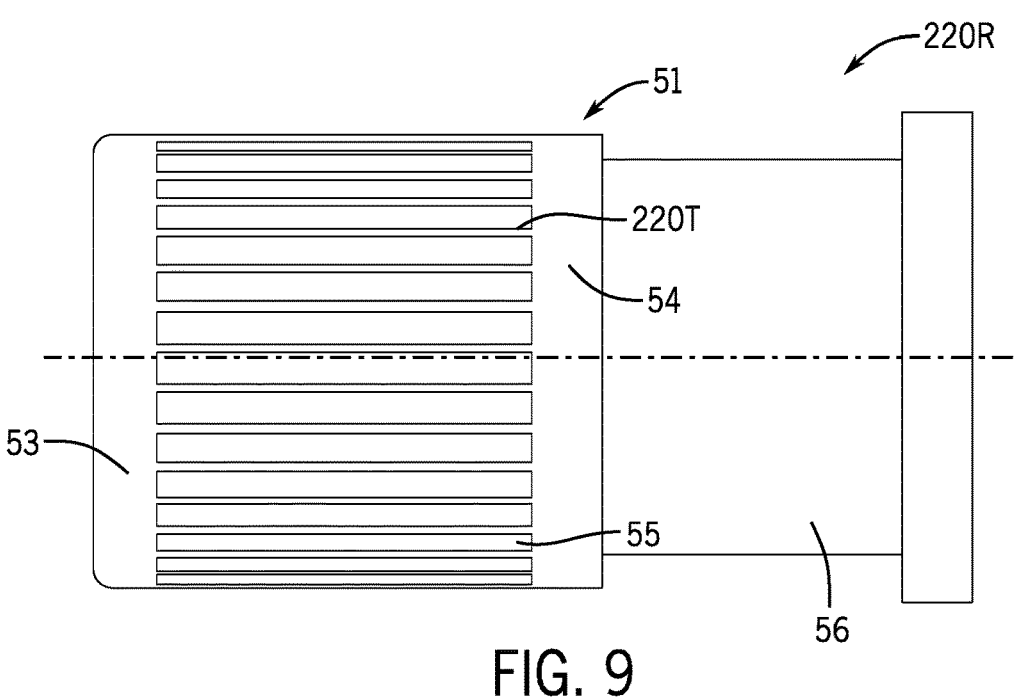
FIG. 9 is a side view illustration of a rotor assembly usable with the x-ray tube of FIG. 1.

Referring to FIG. 9, a rotor 220R in accordance with an aspect of the disclosure includes a cylindrical end hub 51 having the axis of rotation 200 noted above. The illustrated construction includes end rings 53 and 54, between which extends a plurality of rotor bars 55. A rotor support 56 protrudes from the end ring 54. Such a rotor 200R may be equipped with a plurality of rotor teeth 220T, an exemplary embodiment of one of which is shown in FIG. 10.

Figure 10:
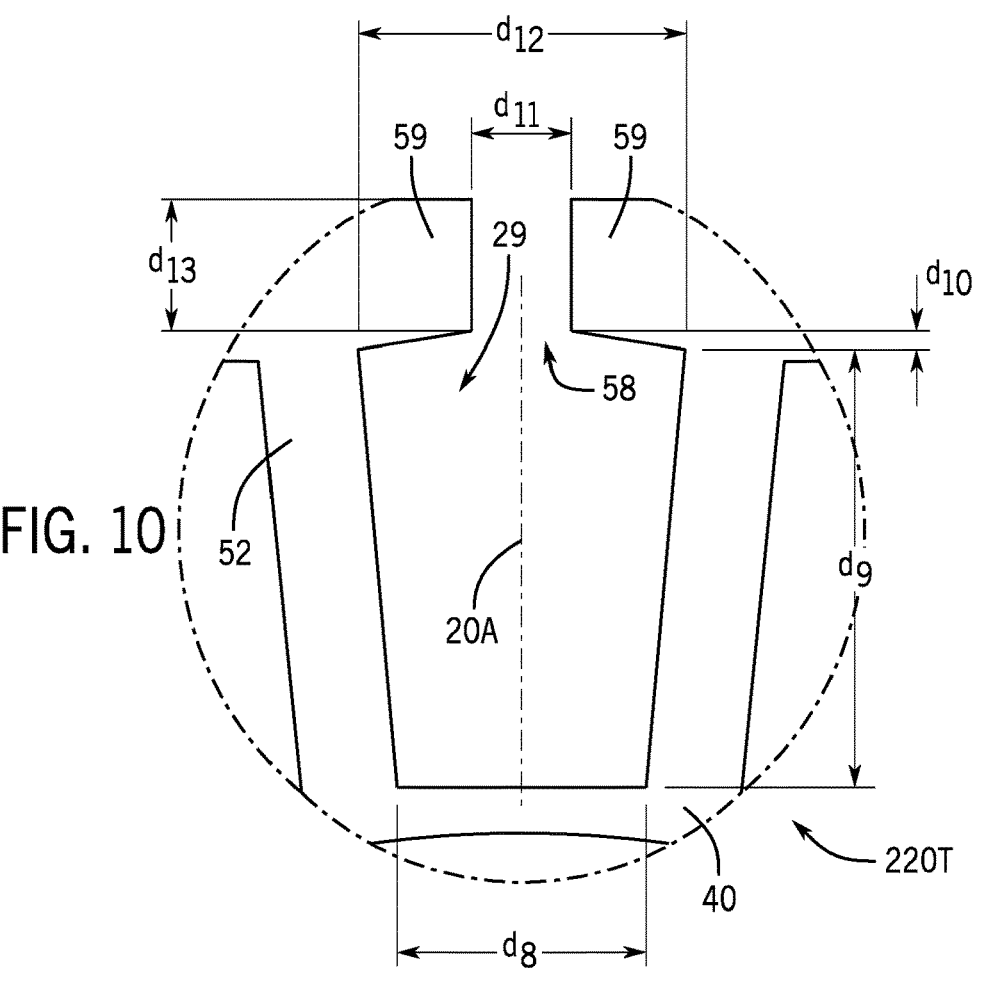
FIG. 10 is a plan view illustration of a representative rotor tooth usable with the rotor assembly shown in FIG. 9.
Figure 11:
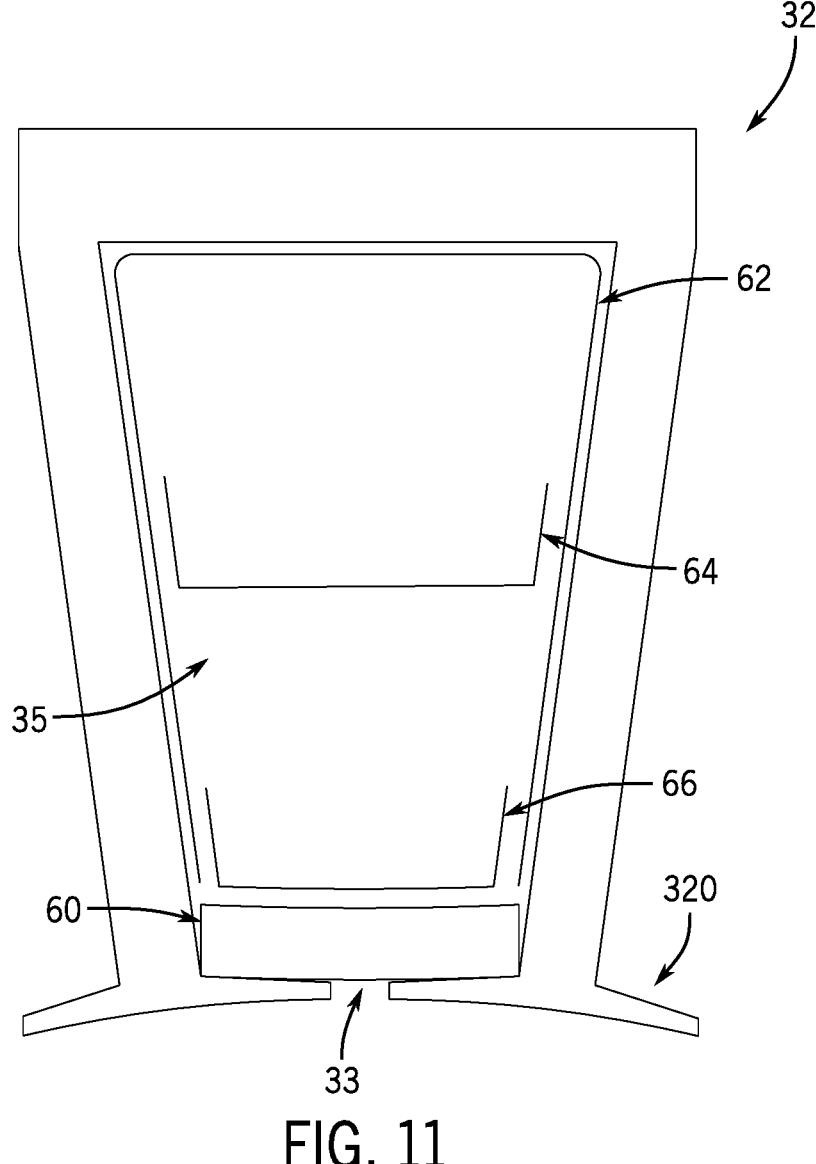
FIG. 11 is a plan view illustration of a representative stator tooth describing an optional method for manufacturing or forming the same.

As shown in the representative embodiment FIG. 10, the rotor tooth 220T is symmetrical about a centerline 20A, and includes a generally arcuate end 40 and radial walls 52, such that the rotor slot 29 is defined as the space between end 40 and radial walls 52. A rotor tooth gap 58 separates rotor tooth tips 59, with the rotor bars 55 of FIG. 9 omitted from FIG. 10 for illustrative simplicity. Dimensions $d_8$, $d_9$, $d_{10}$, $d_{11}$, $d_{12}$, and $d_{13}$ collectively represent the construction of the rotor tooth 220T in a non-limiting embodiment. When the rotor slots are trapezoidal, a depth-to-width ratio of each slot may be approximately 1.29:1, or within ±30% of such a ratio. An exemplary set of such dimensions, $[d_8, d_9, d_{10}, d_{11}, d_{12}, d_{13}]=[0.159, 0.265, 0.010, 0.060, 0.205, 0.080]$ inches. Other embodiments may be envisioned, of similar or different proportions, and therefore the illustrated dimensions are intended to be representative of just one possible construction for use with the x-ray tube 10 of FIG. 1.

Construction of the stator 20S of FIG. 1, in accordance with the various embodiments described above, is shown in FIG. 11. In a possible approach, a stop stick or other suitable tool can be inserted near the tooth tips 320 within the stator slot 35. The stator slot 35 is lined with an application suitable insulating slot liner material 62, with possible top and middle insulating layers 64 and 66 used within the stator slot 35 between different stator windings (not shown). After the stator assembly 20S has been dipped and baked/heat cured, as appreciated in the art, the stop stick 60 is removed. The resulting space thus is available to form part of the cooling region 60 described in detail hereinabove.

Figure 12:
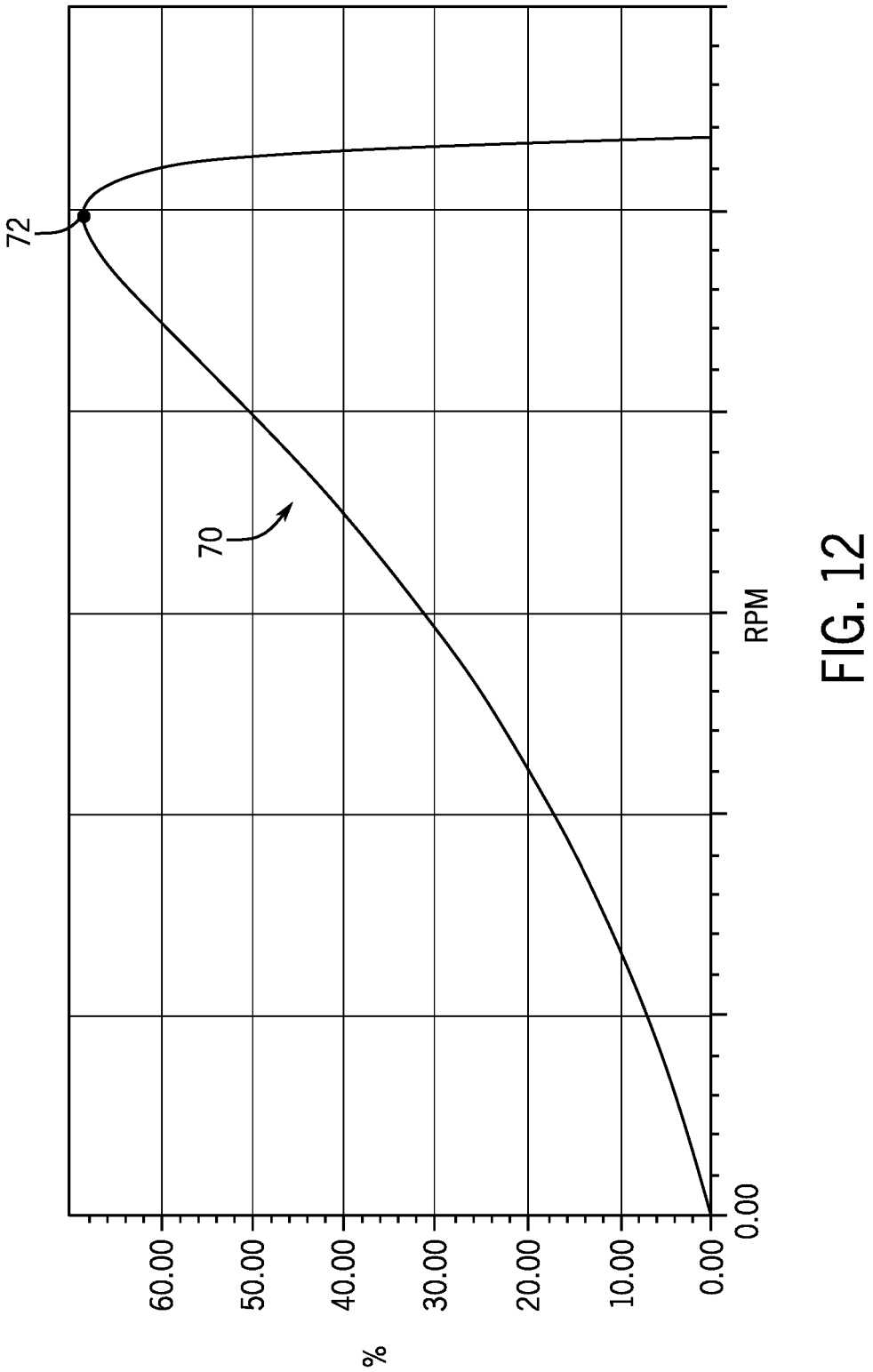
FIG. 12 is a plot of efficiency progression for a representative VFD control scheme usable with the x-ray tube of FIG. 1.

Turning now to FIG. 12, FIG. 12 is a plot 70 of a representative efficiency progression for a representative VFD control scheme usable with the x-ray tube 10 of FIG. 1. In the overall control of the x-ray tube 10, one may seek to balance VFD settings of the motor controller 50 and running continuous at the particular speed at which the electric motor 20 is at its peak efficiency. In a possible implementation, a first setting may be used to ramp the speed of the electric motor 20 from zero to a predetermined maximum before switching to a high-efficiency running mode at the highest efficiency level, represented as operating point 72.

In a possible control implementation, therefore, the electric motor 20 is controlled via VFD, using the motor controller 50 of FIG. 1, in which the motor controller is capable of switching between two or more mode-specific control settings. The settings can include one control mode that is active when starting the electric motor 20 from zero speed, and another setting used during a specific steady-state running speed of the electric motor 20, one that is maintained during an x-ray exposure period in which the x-ray tube 10 is used to image a target.

In another approach when the x-ray tube 10 has been idle for a time, the VFD operating modes can include a temporary "boost stage" during within the motor controller increases output power, for instance to at least 120% of the power level used to maintain the steady-state running operation. As boosting is expected to inject more heat into the electric motor 20, its use should be restricted. Other approaches, especially for LMB implementations of the x-ray tube 10, include maintaining steady-state rotation of the rotor between x-ray exposures, in order to prevent wear on the LMB s and to increase energy efficiency.

As will be appreciated by those skilled in the art in view of the foregoing disclosure, the inclusion of the cooling regions in the overall structure of the stator assembly 20S ensures that the tooth tips of the stator teeth remain immersed in cooling oil, which in turn allows increased torque levels at levels required by high-energy tubes, including commercially available LMB tubes. The cooling regions are integrated into the stator assembly as set forth herein, providing the benefit of reducing heat concentrations in the laminations of the rotor present in a vacuum environment. As described above, the stator teeth protrude into the oil path to create an effective set of cooling fins while also decreasing the size of the gap between the stator tooth and the OD of the rotor 20R. Such positioning helps ensure that the motor 20 runs cooler due to the extended design of the stator teeth and immersion in the cooling oil. The improvements in efficiency in turn allow for the creation of more efficient x-ray tube 10.

While these systems and methods have been described with reference to exemplary embodiments, it will be understood by those skilled in the art that various changes may be made and equivalents can be substituted to adapt these teachings to other problems, materials, and technologies, without departing from the scope of the claims. Features, aspects, components or acts of one embodiment may be combined with features, aspects, components, or acts of other embodiments described herein. The invention is thus not limited to the particular examples that are disclosed, but encompasses all embodiments falling within the appended claims.

The claims following this written disclosure are hereby expressly incorporated into the present written disclosure, with each claim standing on its own as a separate embodiment. This disclosure includes all permutations of the independent claims with their dependent claims. Moreover, additional embodiments capable of derivation from the independent and dependent claims that follow are also expressly incorporated into the present written description. These additional embodiments are determined by replacing the dependency of a given dependent claim with the phrase "any of the claims beginning with claim [x] and ending with the claim that immediately precedes this one," where the bracketed term "[x]" is replaced with the number of the most recently recited independent claim. For example, for a first claim set that begins with independent claim 1, claim 3 can depend from either of claims 1 and 2, with these separate dependencies yielding two distinct embodiments; claim 4 can depend from any one of claim 1, 2, or 3, with these separate dependencies yielding three distinct embodiments; claim 5 can depend from any one of claim 1, 2, 3, or 4, with these separate dependencies yielding four distinct embodiments; and so on.

One aspect of the present disclosure relates to an x-ray tube system 10 comprising: a housing 15 containing cooling oil 19; a vacuum envelope 12 disposed within the housing 15 and including a solid envelope wall 12, wherein the cooling oil 19 is disposed between the housing 15 and the solid envelope wall 12; an anode 16 and a cathode 18 arranged in a vacuum environment and surrounded by the solid envelope wall 12; a rotor 20R connected to the anode 16 and arranged on bearings 25 within the vacuum environment; and a stator assembly 20S positioned within the cooling oil 19 and surrounding the rotor 20R to define an oil-filled annular gap 12F, the stator assembly 20S comprising: a stator core 30; a plurality of stator teeth 32 extending from the stator core 30 and spaced apart from each other by intervening stator slots 35; and stator windings 34 disposed within the stator slots 35, wherein each respective one of the stator teeth 32 includes a respective tooth tip 59/320 set a predetermined distance $d_1$ apart from the stator windings 34 to form an intra-slot cooling channel 36 in fluid communication with the oil-filled annular gap G2, such that the stator teeth 32 inclusive of the respective tooth tip 59/320 are fully immersed in the cooling oil 19.

In some embodiments, the bearings 25 comprise liquid metal bearings.

In some embodiments, each respective one of the stator slots 35 has a corresponding tooth root 40 and defines a total slot volume extending between the tooth tip 59/320 and the corresponding tooth root 40, and wherein a ratio of copper of the stator windings in the stator slot to a total slot area of the stator slot 35 is less than about 75%.

In some embodiments, the total slot volume is trapezoidal. In some embodiments, the total slot volume is defined by curvilinear slot walls 49. In some embodiments, a radial distance between the tooth tip 59/320 and the corresponding tooth root 40 is less than 1 inch.

In some embodiments, each respective tooth tip 59/320 is spaced apart from a pair of adjacent tooth tips 59/320 by a distance of between 0.5% and 4% of an inner diameter (ID) dimension of the stator core 30.

In some embodiments, a distance from the tooth tip 59/320 to the stator winding 34 is at least 0.08 inches.

In some embodiments, the rotor 20R/120R/220R includes a plurality of rotor slots 29/129/131 each containing therein a respective ferromagnetic rotor bar 55.

In some embodiments, the plurality of rotor slots 29/129/131 have a rectangular or trapezoidal cross-sectional shape.

In some embodiments, the stator core 30 has an inner diameter (ID) dimension of less than about 11 inches and a length of less than about 2.5 inches.

In some embodiments, the length of the stator core 30 is between 13% and 76% of the ID dimension of the stator core 30.

In some embodiments, a longitudinal length dimension of the stator core 30 is between 35% and 40% of the inner diameter dimension of the stator core 30.

In some embodiments, the rotor 120R/220R comprises a rotor core 133/135, and a radial gap dimension between the rotor core 133/135 and the stator core 30 is between about 1.5% and 30% of an inner diameter dimension of the stator core 30.

In some embodiments, the system can further comprise a motor controller 50 operable for switching between two or more mode-specific control settings, including a ramp setting that is active when starting rotation of the rotor 20R/120R/220R from zero speed, and a steady-state setting that is maintained during an x-ray exposure period in which the x-ray tube system 10 is used to image a target.

In some embodiments, using the ramp setting, the motor controller 50 is configured to temporarily increase output power to at least 120% of a power level used to maintain the steady-state setting.

Another aspect of the disclosure relates to a stator assembly 20S for use with an x-ray tube 10 having a rotatable anode 16 coupled to a rotor 20R, comprising: a stator core a plurality of stator teeth 32 connected to the stator core 30 and spaced apart from each other by intervening stator slots 35; and stator windings 34 disposed within the stator slots wherein each respective one of the stator teeth 32 includes a tooth tip 59/320 positioned adjacent to a solid envelope wall 12 and set a predetermined distance apart from the stator windings to form an intra-slot cooling channel 36 in fluid communication with an annular gap G2 filled with oil 19, wherein the stator teeth 32 are immersed in the oil 19, and wherein the stator assembly 20S is configured to be positioned within the oil 19 and to surround the rotor 20R/120R/220R to define the annular gap G2.

In some embodiments, each respective one of the stator slots 35 has a corresponding tooth root 40 and defines a total slot volume extending between the tooth tip 59/320 and the corresponding tooth root 40, and wherein a ratio of copper of the stator windings in the stator slot to a total slot area of the stator slot is less than about 50%.

In some embodiments, the stator assembly 20S includes a stator core 30 having an inner diameter dimension of less than about 11 inches and a longitudinal length dimension of less than about 2.5 inches.

In some embodiments, a longitudinal length dimension of the stator core 30 is between about 35% and 40% of the inner diameter dimension of the stator core 30. Recitation in the claims of the term "first" with respect to a feature or element does not necessarily imply the existence of a second or additional such feature or element. Elements specifically recited in means-plus-function format, if any, are intended to be construed to cover the corresponding structure, material, or acts described herein and equivalents thereof in accordance with 35 U.S.C. § 112(f). Embodiments of the invention in which an exclusive property or privilege is claimed are defined as follows.

The invention claimed is:

1. An x-ray tube system, comprising:
a housing containing cooling oil;
a vacuum envelope disposed within the housing and including a solid envelope wall, wherein the cooling oil is disposed between the housing and the solid envelope wall;
an anode and a cathode arranged in a vacuum environment and surrounded by the solid envelope wall;
a rotor connected to the anode and arranged on bearings within the vacuum environment; and
a stator assembly positioned within the cooling oil and surrounding the rotor to define an oil-filled annular gap, the stator assembly comprising:
a stator core;
a plurality of stator teeth extending from the stator core and spaced apart from each other by intervening stator slots; and
stator windings disposed within the stator slots, wherein each respective one of the stator teeth includes a respective tooth tip set a predetermined distance apart from the stator windings to form an intra-slot cooling channel in fluid communication with the oil-filled annular gap, such that the stator teeth inclusive of the respective tooth tip are fully immersed in the cooling oil.

2. The x-ray tube system of claim 1, wherein the bearings comprise liquid metal bearings.

3. The x-ray tube system of claim 1, wherein each respective one of the stator slots has a corresponding tooth root and defines a total slot volume extending between the tooth tip and the corresponding tooth root, and wherein a ratio of copper of the stator windings in the stator slot to a total slot area of the stator slot is less than about 75%.

4. The x-ray tube system of claim 3, wherein the total slot volume is trapezoidal.

5. The x-ray tube system of claim 3, wherein the total slot volume is defined by curvilinear slot walls.

6. The x-ray tube system of claim 3, wherein a radial distance between the tooth tip and the corresponding tooth root is less than 1 inch.

7. The x-ray tube system of claim 1, wherein each respective tooth tip is spaced apart from a pair of adjacent tooth tips by a distance of between 0.5% and 4% of an inner diameter dimension of the stator core.

8. The x-ray tube system of claim 7, wherein a distance from the tooth tip to the stator windings is at least 0.08 inches.

9. The x-ray tube system of claim 1, wherein the rotor includes a plurality of rotor slots each containing therein a respective ferromagnetic rotor bar.

10. The x-ray tube system of claim 9, wherein the plurality of rotor slots have a rectangular or trapezoidal cross-sectional shape.

11. The x-ray tube system of claim 1, wherein the stator core has an inner diameter dimension of less than about 11 inches and a length of less than about 2.5 inches.

12. The x-ray tube system of claim 11, wherein the length of the stator core is between 13% and 76% of the inner diameter dimension of the stator core.

13. The x-ray tube system of claim 11, wherein a longitudinal length dimension of the stator core is between 35% and 40% of the inner diameter dimension of the stator core.

14. The x-ray tube system of claim 1, wherein the rotor comprises a rotor core, and wherein a radial gap dimension between the rotor core and the stator core is between about 1.5% and 30% of an inner diameter dimension of the stator core.

15. The x-ray tube system of claim 1, further comprising a motor controller operable for switching between two or more mode-specific control settings, including a ramp setting that is active when starting rotation of the rotor from zero speed, and a steady-state setting that is maintained during an x-ray exposure period in which the x-ray tube system is used to image a target.

16. The x-ray tube system of claim 15, wherein using the ramp setting, the motor controller is configured to temporary increase output power to at least 120% of a power level used to maintain the steady-state setting.

17. An x-ray tube comprising:
a stator assembly comprising:
a stator core;
a plurality of stator teeth connected to the stator core and spaced apart from each other by intervening stator slots; and
stator windings disposed within the stator slots;
a rotatable anode coupled to a rotor; and
a solid envelope wall, wherein each respective one of the stator teeth includes a tooth tip positioned adjacent to the solid envelope wall and set a predetermined distance apart from the stator windings to form an intra-slot cooling channel in fluid communication with an annular gap filled with oil, wherein the stator teeth are immersed in the oil, and wherein the stator assembly is positioned within the oil and surrounds the rotor to define the annular gap.

18. The x-ray tube of claim 17, wherein each respective one of the stator slots has a corresponding tooth root and defines a total slot volume extending between the tooth tip and the corresponding tooth root, and wherein a ratio of copper of the stator windings in the stator slot to a total slot area of the stator slot is less than about 50%.

19. The x-ray tube of claim 17, wherein the stator assembly includes a stator core having an inner diameter dimension of less than about 11 inches and a longitudinal length dimension of less than about 2.5 inches.

20. The x-ray tube of claim 19, wherein a longitudinal length dimension of the stator core is between about 35% and 40% of the inner diameter dimension of the stator core.

\*    \*    \*    \*    \*